US011395329B2

(12) United States Patent
Namjoshi et al.

(10) Patent No.: US 11,395,329 B2
(45) Date of Patent: Jul. 19, 2022

(54) UPLINK TRAFFIC PRIORITIZATION ACROSS MULTIPLE LINKS

(71) Applicant: QUALCOMM Incorporated, San Diego, CA (US)

(72) Inventors: Aditya Namjoshi, San Diego, CA (US); Chaehun Park, Carlsbad, CA (US); Harish Bhandiwad, San Diego, CA (US); Rajendra Chiguluri, San Diego, CA (US); Snehal Sanjeev Sonvane, San Diego, CA (US); Timothy Kong, San Diego, CA (US); Amogh Kashyap, San Diego, CA (US); Srivastav Reddy Atla, San Diego, CA (US); Bhanik Shah, San Jose, CA (US); Sitaramanjaneyulu Kanamarlapudi, San Diego, CA (US); Arnaud Meylan, San Diego, CA (US); Xinchen Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 16/907,131

(22) Filed: Jun. 19, 2020

(65) Prior Publication Data

US 2021/0400709 A1    Dec. 23, 2021

(51) Int. Cl.
*H04W 56/00* (2009.01)
*H04W 72/14* (2009.01)
(Continued)

(52) U.S. Cl.
CPC .......... *H04W 72/14* (2013.01); *H04L 1/1642* (2013.01); *H04L 5/0094* (2013.01);
(Continued)

(58) Field of Classification Search
CPC ............ H04W 72/14; H04W 72/0413; H04W 72/0446; H04W 72/10; H04L 1/1642; H04L 5/0094
(Continued)

(56) References Cited

U.S. PATENT DOCUMENTS

2006/0190720 A1* 8/2006 Ozaki ................. H04L 63/0485
713/160
2008/0198785 A1* 8/2008 Huang .................. H04L 5/0007
370/312
(Continued)

OTHER PUBLICATIONS

International Search Report and Written Opinion—PCT/US2021/033384—ISA/EPO—dated Oct. 12, 2021 (202009WO).

*Primary Examiner* — Sai Ming Chan
(74) *Attorney, Agent, or Firm* — Holland & Hart LLP

(57) ABSTRACT

Methods, systems, and devices for wireless communications are described. A user equipment (UE) may identify a communication configuration for a bearer including a first link and a second link. The UE may identify packets for transmission, and each of the packets may be associated with a sequence number. The UE may receive a first grant of first uplink resources and a second grant of second uplink resources, and the UE may determine an association of the packets to the first uplink resources or the second uplink resources based on the sequence numbers of the packets and respective completion times of decoding processes associated with the first uplink resources and the second uplink resources. The UE may transmit the packets over the first uplink resources or the second uplink resources in accordance with the determined association of the packets to the first uplink resources or the second uplink resources.

30 Claims, 10 Drawing Sheets

(51) Int. Cl.
    *H04L 1/16*     (2006.01)
    *H04L 5/00*     (2006.01)
    *H04W 72/04*     (2009.01)
    *H04W 72/10*     (2009.01)

(52) U.S. Cl.
    CPC ... *H04W 72/0413* (2013.01); *H04W 72/0446* (2013.01); *H04W 72/10* (2013.01)

(58) Field of Classification Search
    USPC .......................................................... 370/329
    See application file for complete search history.

(56) References Cited

U.S. PATENT DOCUMENTS

| | | | |
|---|---|---|---|
| 2012/0008496 A1* | 1/2012 | Saavedra | H04L 45/123 370/231 |
| 2016/0105353 A1* | 4/2016 | Cociglio | H04L 43/50 370/252 |
| 2018/0279358 A1 | 9/2018 | Babaei et al. | |
| 2020/0145888 A1* | 5/2020 | Paladugu | H04W 72/042 |
| 2021/0185747 A1* | 6/2021 | Kanamarlapudi | H04W 36/30 |

\* cited by examiner

UPLINK TRAFFIC PRIORITIZATION ACROSS MULTIPLE LINKS

FIELD OF TECHNOLOGY

The following relates generally to wireless communications and more specifically to uplink traffic prioritization across multiple links.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured to operate on multiple radio links and/or in multiple frequency ranges (FRs). In some cases, a UE may be configured in a dual-connectivity mode where the UE may communicate with two or more cells at one or more base stations using different FRs. In such systems, the UE may be scheduled to transmit uplink signals using one or multiple FRs. In some cases, the UE may transmit uplink data on multiple FRs when a buffer status of the UE is above a threshold. Current techniques for communicating via multiple FRs may fail to efficiently utilize low latency links or FRs for high priority data transmissions.

SUMMARY

The described techniques relate to improved methods, systems, devices, and apparatuses that support uplink traffic prioritization across multiple links. Generally, the described techniques provide for reducing latency by ordering and/or prioritizing packet transmissions based on uplink resources that correspond to a resource grant. For example, a user equipment (UE) may communicate with one or more base stations via multiple links, and the UE may transmit a first group of packets on a first link based on a decoding time associated with uplink resources that correspond to the first link.

For example, a UE may identify a communication configuration for a bearer including a first link and a second link. The UE may identify one or more packets for transmission via the bearer, and each of the one or more packets may be associated with a sequence number. The UE may receive a first grant of first uplink resources of the first link and a second grant of second uplink resources of the second link, and the UE may determine an association of the one or more packets to the first uplink resources or the second uplink resources based on the sequence numbers of the one or more packets and respective completion times of decoding processes associated with the first uplink resources and the second uplink resources. The UE may transmit the one or more packets over the first uplink resources or the second uplink resources in accordance with the determined association of the one or more packets to the first uplink resources or the second uplink resources.

A method of wireless communication at a UE is described. The method may include identifying a communication configuration for a bearer including a first link and a second link, identifying one or more packets for transmission via the bearer, each of the one or more packets associated with a sequence number, receiving a first grant of first uplink resources of the first link and a second grant of second uplink resources of the second link, determining an association of the one or more packets to the first uplink resources or the second uplink resources based on the sequence numbers of the one or more packets and respective completion times of decoding processes associated with the first uplink resources and the second uplink resources, and transmitting the one or more packets over the first uplink resources or the second uplink resources in accordance with the determined association of the one or more packets to the first uplink resources or the second uplink resources.

An apparatus for wireless communication at a UE is described. The apparatus may include a processor, memory coupled with the processor, and instructions stored in the memory. The instructions may be executable by the processor to cause the apparatus to identify a communication configuration for a bearer including a first link and a second link, identify one or more packets for transmission via the bearer, each of the one or more packets associated with a sequence number, receive a first grant of first uplink resources of the first link and a second grant of second uplink resources of the second link, determine an association of the one or more packets to the first uplink resources or the second uplink resources based on the sequence numbers of the one or more packets and respective completion times of decoding processes associated with the first uplink resources and the second uplink resources, and transmit the one or more packets over the first uplink resources or the second uplink resources in accordance with the determined association of the one or more packets to the first uplink resources or the second uplink resources.

Another apparatus for wireless communication at a UE is described. The apparatus may include means for identifying a communication configuration for a bearer including a first link and a second link, identifying one or more packets for transmission via the bearer, each of the one or more packets associated with a sequence number, receiving a first grant of first uplink resources of the first link and a second grant of second uplink resources of the second link, determining an association of the one or more packets to the first uplink resources or the second uplink resources based on the sequence numbers of the one or more packets and respective completion times of decoding processes associated with the first uplink resources and the second uplink resources, and transmitting the one or more packets over the first uplink resources or the second uplink resources in accordance with the determined association of the one or more packets to the first uplink resources or the second uplink resources.

A non-transitory computer-readable medium storing code for wireless communication at a UE is described. The code may include instructions executable by a processor to identify a communication configuration for a bearer including a first link and a second link, identify one or more packets for transmission via the bearer, each of the one or more packets associated with a sequence number, receive a first grant of first uplink resources of the first link and a second grant of second uplink resources of the second link, determine an association of the one or more packets to the first uplink resources or the second uplink resources based on the sequence numbers of the one or more packets and respective completion times of decoding processes associated with the first uplink resources and the second uplink resources, and transmit the one or more packets over the first uplink resources or the second uplink resources in accordance with the determined association of the one or more packets to the first uplink resources or the second uplink resources.

Some examples of the method, apparatuses, and non-transitory computer-readable medium described herein may further include operations, features, means, or instructions for identifying a first set of characteristics of the first uplink resources and a second set of characteristics of the second uplink resources, and determining the respective completion times of the decoding processes associated with the first uplink resources and the second uplink resources based on the first set of characteristics and the second set of characteristics.

Some examples of the method, apparatuses, and non-transitory computer-readable medium described herein may further include operations, features, means, or instructions for determining respective timing of the first uplink resources and the second uplink resources based on the first set of characteristics and the second set of characteristics, and determining the association of the one or more packets to the first uplink resources or the second uplink resources based on the respective timing of the first uplink resources and the second uplink resources.

In some examples of the method, apparatuses, and non-transitory computer-readable medium described herein, the respective timing includes respective start times or respective end times of the first uplink resources and the second uplink resources.

In some examples of the method, apparatuses, and non-transitory computer-readable medium described herein, the first and second sets of characteristics include respective sub-carrier spacings, respective transmission time intervals, respective uplink transmission start times, respective uplink transmission lengths, or combinations thereof.

In some examples of the method, apparatuses, and non-transitory computer-readable medium described herein, the one or more packets include a first packet of a first priority and a second packet of a second priority that may be higher than the first priority, the method further including assigning the second packet to resources having a first completion time of the respective completion times of the decoding processes associated with the first uplink resources and the second uplink resources.

Some examples of the method, apparatuses, and non-transitory computer-readable medium described herein may further include operations, features, means, or instructions for determining respective characteristics associated with decoding of the first uplink resources and the second uplink resources by one or more base stations, and determining the respective completion times of the decoding processes associated with the first uplink resources and the second uplink resources based on the respective characteristics.

In some examples of the method, apparatuses, and non-transitory computer-readable medium described herein, determining the respective characteristics associated with decoding of the first uplink resources and the second uplink resources by the one or more base stations may include operations, features, means, or instructions for determining respective acknowledgment transmission patterns of the one or more base stations.

Some examples of the method, apparatuses, and non-transitory computer-readable medium described herein may further include operations, features, means, or instructions for determining respective downlink scheduling patterns of the first link and the second link, and determining the association of the one or more packets to the first uplink resources or the second uplink resources based on the respective downlink scheduling patterns.

Some examples of the method, apparatuses, and non-transitory computer-readable medium described herein may further include operations, features, means, or instructions for identifying a primary link of the first link and the second link based on the downlink scheduling pattern, where determining the association of the one or more packets to the first uplink resources or the second uplink resources may be based on the primary link.

In some examples of the method, apparatuses, and non-transitory computer-readable medium described herein, the sequence number corresponds to a packet data convergence protocol (PDCP) sequence number.

DETAILED DESCRIPTION

Figure 1:
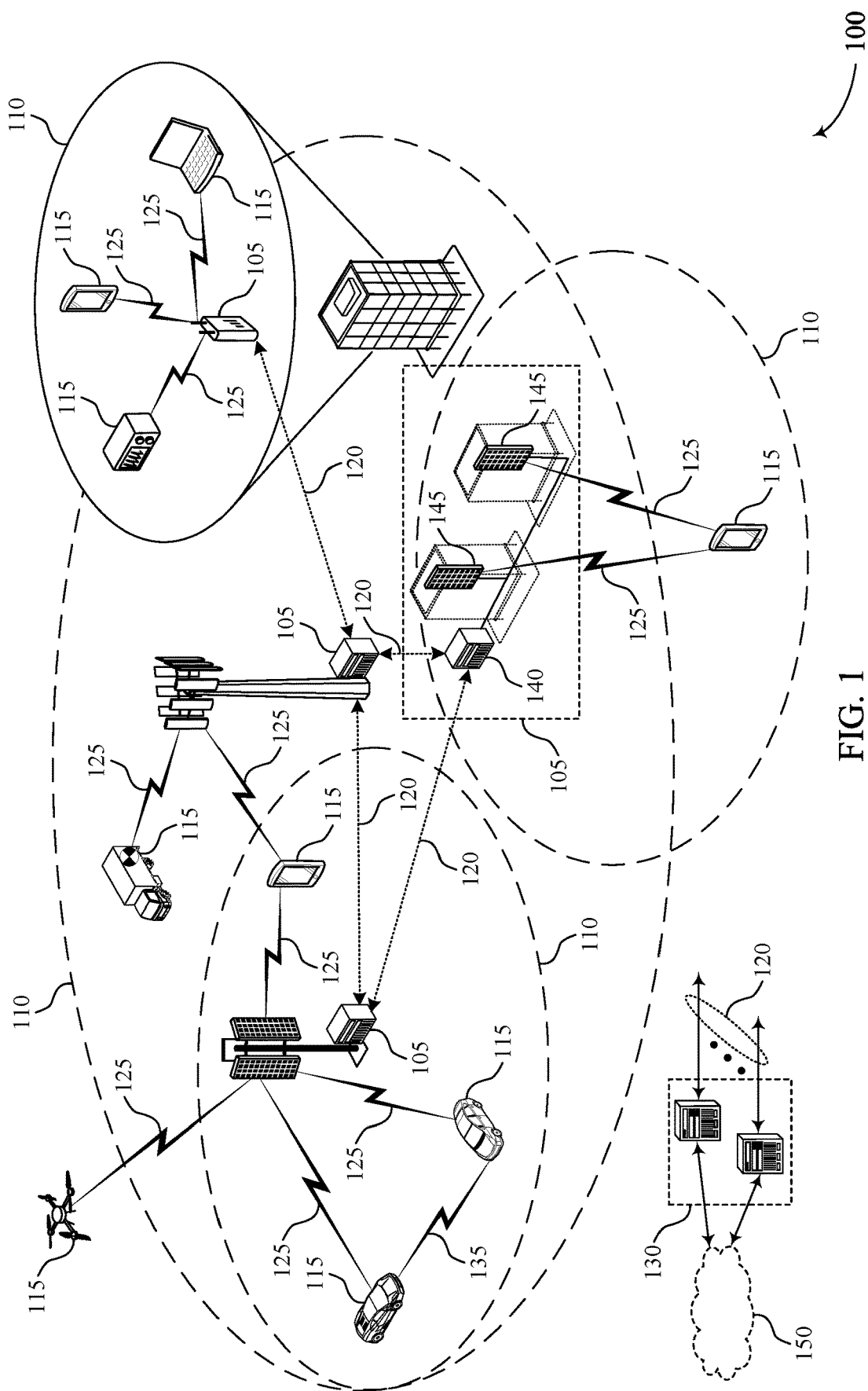
FIG. 1 illustrates an example of a system for wireless communications that supports uplink traffic prioritization across multiple links in accordance with aspects of the present disclosure.

In some wireless communications systems, a user equipment (UE) may be configured to operate on multiple radio links and/or in multiple frequency ranges (FRs) (e.g., in a sub 6 GHz FR and in a millimeter wave (mmW) FR, in multiple mmW FRs, etc.). In some cases, a UE may be configured in a dual-connectivity mode where the UE may communicate with two or more cells at one or more base stations using different FRs (e.g., using FR1 at a first cell group and using FR2 at a second cell group). In other cases, a UE may be configured with one or more FR1 component carriers (CCs) and one or more FR2 CCs. In such systems, the UE may be scheduled to transmit uplink signals (e.g., data, control, or reference signals) using one or multiple FRs. In some cases, the UE may transmit uplink data on multiple FRs when a buffer status of the UE is above a threshold. This may, however, fail to utilize low latency links or FRs for high priority data transmissions (e.g., acknowledgements (ACKs), high-priority traffic, etc.).

Various aspects of the present disclosure provide techniques for handling uplink transmissions in the context of multiple links, multiple cells, multiple frequency regions, or multiple types of transmission time intervals (TTIs) (e.g., subframes, slots, mini-slots). For example, the UE may transmit data on an uplink resource based on a known or anticipated network decoding time for data transmitted according to the uplink resource. In some cases, the UE may receive multiple uplink grants and determine a network decoding order of uplink transmissions corresponding to the grants. High priority traffic may be transmitted based on when the traffic will be decoded by the network, which may allow the network to receive and decode high priority traffic before lower priority traffic. In some cases, packets of same or similar priority may be split into multiple groups, and each group may be transmitted in accordance with uplink resources such that the packets are processed by the network in sequential order. A UE may generate packets such that sequence numbers (e.g., packet data control protocol (PDCP) sequence numbers) associated with a first group (e.g., high priority) of packets are lower than the sequence numbers associated with a second group (e.g., lower priority) of packets, so the network may receive data packets in sequential order, which may decrease system latency.

Such techniques may include determining when data corresponding to a number of uplink resources will be processed by a base station and transmitting data according to one or more uplink resources based on when the data will be processed by the base station. In such cases, the UE may select uplink resources (e.g., uplink resources corresponding to a received grant, a radio access technology (RAT), a frequency region, a link, a time-domain, or any combination thereof) based on time-frequency parameters and/or a downlink transmission pattern. The time-frequency parameters may include an indication of subcarrier spacing (SCS), an offset between a downlink (DL) slot where an indication (e.g., a physical downlink control channel (PDCCH), a downlink control information (DCI), etc.) was received and an uplink (UL) slot where UL data may be transmitted (e.g., sent on physical uplink shared channel (PUSCH)), which may be referred to as K2, a start symbol and allocation length indicator value (SLIV), an uplink scheduling pattern (e.g., a slot format indication (SFI), a pattern of past uplink transmissions, etc.), or any combination thereof. The downlink transmission patterns may include an ACK/NACK pattern, an average ACK/NACK response time, the frequency of scheduling on an FR or a link, a primary FR, a primary link, or any combination thereof. Determining uplink resources based on time-frequency parameters and/or a downlink transmission pattern may improve system efficiency and decrease latency.

Aspects of the disclosure are initially described in the context of wireless communications systems. Aspects of the present disclosure are then described with reference to uplink data prioritization techniques and a process flow. Aspects of the disclosure are further illustrated by and described with reference to apparatus diagrams, system diagrams, and flowcharts that relate to uplink traffic prioritization across multiple links.

FIG. 1 illustrates an example of a wireless communications system 100 that supports uplink traffic prioritization across multiple links in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may order and/or prioritizing packet transmissions based on uplink resources that correspond to a resource grant. For example, a UE 115 may communicate with one or more base stations 115 via multiple links, and the UE 115 may transmit a first group of packets on a first link based on a decoding time associated with uplink resources that correspond to the first link.

For example, the UE 115 may identify a communication configuration for a bearer including a first link and a second link as well as one or more packets for transmission via the bearer, and each of the one or more packets may be associated with a sequence number. The UE 115 may receive a first grant of first uplink resources of the first link and a second grant of second uplink resources of the second link, and the UE 115 may determine an association of the one or more packets to the first uplink resources or the second uplink resources based on the sequence numbers of the one or more packets and respective completion times of decoding processes associated with the first uplink resources and the second uplink resources. The UE 115 may transmit the one or more packets over the first uplink resources or the second uplink resources in accordance with the determined association of the one or more packets to the first uplink resources or the second uplink resources.

Figure 2:
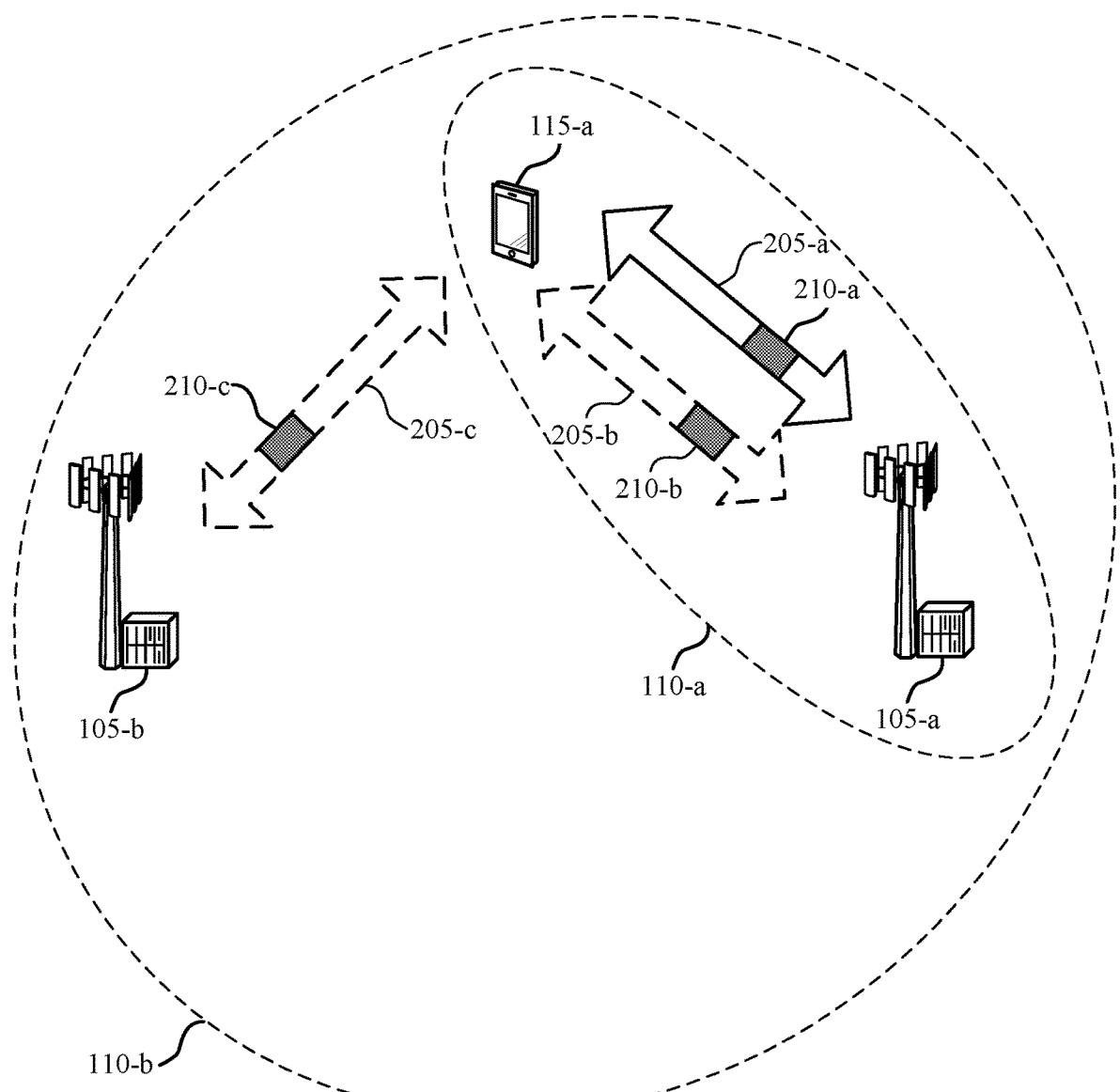
FIG. 2 illustrates an example of a wireless communications system that supports uplink traffic prioritization across multiple links in accordance with aspects of the present disclosure.

FIG. 2 illustrates an example of a wireless communications system 200 that supports uplink traffic prioritization in accordance with aspects of the present disclosure. In some examples, wireless communications system 200 may implement aspects of wireless communications system 100. Wireless communications system 200 may include base station 105-a and base station 105-b, which may be examples of a base station 105 as described with reference to FIG. 1. Each base station 105 may be associated with a number of cells as well as a number of coverage areas 110, and UE 115-a may communicate with one or more base stations 105 via the links 205.

UE 115-a may be associated with base station 105-a, and UE 115-a may communicate with base station 105-a via link 205-a. UE 115-a may additionally communicate with base station 105-a via link 205-b, while in some additional or alternative cases, UE 115-a may communicate with base station 105-b via link 205-c. In some cases, base station 105-a may be associated with a first RAT (e.g., 5G NR), and base station 105-b may be associated with a second RAT (e.g., 4G LTE). UE 115-a may communicate with one or more base stations 105 via multiple links 205 (e.g., link 205-a and link 205-b, link 205-a and link 205-c), and UE may select a link 205 for transmitting uplink data based on time-frequency parameters and/or a downlink transmission pattern, which may decrease system latency.

UE 115-a may receive multiple indications (e.g., an uplink grant, DCI, a physical downlink shared channel (PDSCH), a PDCCH) from one or more base stations 105. In some examples, UE 115-a may operate in a dual connectivity mode and receive a first grant (e.g., PDCCH) over link 205-c and a second grant over link 205-a. The first grant may indicate a first PUSCH 210-c, and the second grant may indicate a second PUSCH 210-a. In some cases, UE 115-a may receive a third grant indicating a third PUSCH 210-b. UE 115-a may determine or predict a completion time for processing data associated with the first PUSCH 210-c by base station 105-b and a completion time for processing data associated with the second PUSCH 210-a by base station 105-a, and UE 115-a may determine which completion time is earlier. In some cases, UE 115-a may transmit packets (e.g., high priority packets, ACK/NACK packets, PDCP packets, etc.) as part of the PUSCH that is associated with the earlier completion time for processing the packets. For example, the completion time for processing data associated with the second PUSCH 210-a may be earlier than the completion time for processing data associated with the first PUSCH 210-c, so UE 115-a may transmit high priority packets over link 205-a as part of the second PUSCH 210-a. In some cases, UE 115-a may transmit a first group of packets as part of the second PUSCH 210-a and a second group of packets as part of the first PUSCH 210-c. The first group of packets may be associated with PDCP sequence numbers that are lower than PDCP sequence numbers associated with the second group of packets, and since the completion time for processing the first group of packets precedes the completion time for processing the second group of packets, the network may process PDCP packets in sequential order.

UE 115-a may determine or predict the completion time for processing data associated with an uplink resource (e.g., a PUSCH 210, a PUCCH, etc.) based on an over the air (OTA) time associated with the resources (e.g., start time, end time) and/or a decoding time associated with a base station 105 decoding the data associated with the uplink resources. In some cases, the end time of the OTA time may be based on time-frequency parameters such as SCS, K2, SLIC, or SFI, and may be referred to as Ei. The decoding time may be referred to as Di, and may be based on downlink transmission patterns such as an ACK/NACK pattern, an average ACK/NACK response time, a historic pattern of scheduling a link or an FR, a minimum value associated with a past PUSCH ACK/NACK timing, or an estimated value based on a grant (e.g., an uplink grant, a PDCCH, a PDSCH) decoding time (e.g., N1). UE 115-a may determine the completion time for processing data associated with an uplink resource based on the end time of the OTA time (Ei), the decoding time associated with a base station (Di), or both (e.g., Ei+Di). In some cases, UE 115-a may determine the completion time for processing data associated with an uplink resource based on a PUSCH preparation time (e.g., N2), and the PUSCH preparation time may correspond to a first capability of UE 115-*a* (e.g., capability1) or a second capability of UE 115-*a* (e.g., capability2). In some cases, UE 115-*a* may handle grants and perform MAC packet building according to the order in which the packets will be decoded by a base station 105, which may be represented by the completion time for processing data associated with an uplink resource.

In other examples, UE 115-*a* may operate in a carrier aggregation (CA) mode and receive a first grant (e.g., a first indication) as well as a second grant (e.g., a second indication) from base station 105-*a*. The first grant may be associated with a first FR (e.g., FR1, link 205-*a*) and first time resources, and the second grant may be associated with a second FR (e.g., FR2, link 205-*b*) and second time resources. The time resources of the second grant may precede the time resources of the first grant, so UE 115-*a* may transmit packets (e.g., high priority packets, ACK/NACK packets, etc.) on the FR corresponding to the second grant (e.g., FR2, link 205-*b*). In some cases, the FRs corresponding to the first grant and the FRs corresponding to the second grant may each be associated with a different CS. The SCS associated with the FRs corresponding to the second grant may be larger than the SCS associated with the FRs corresponding to the first grant, and the symbol times of the FRs corresponding to the second grant may be shorter than the symbol times of the FRs corresponding to the first grant. As such, depending on where the grants start and the number of symbols, the OTA time of the second FRs may be before the OTA time of the first FRs. In some cases, UE 115-*a* may transmit additional packets on the FR corresponding to the first grant (e.g., FR1, link 205-*a*).

In other examples, UE 115-*a* may receive a first indication from base station 105-*a* that corresponds to first uplink resources (e.g., a 12 OFDM symbol slot, a 14 OFDM symbol slot) and a second indication from base station 105-*a* that corresponds to second uplink resources (e.g., a minislot, a 2 OFDM symbol slot, a 4 OFDM symbol slot, a 7 OFDM symbol slot). The first uplink resources and the second uplink resources may correspond to overlapping time resources, so UE 115-*a* may transmit packets (e.g., high priority packets, ACK/NACK packets, etc.) according to the second uplink resources as base station 105-*a* may process data corresponding to a slot containing fewer symbols faster than data corresponding to a slot containing more symbols.

Figure 3A:
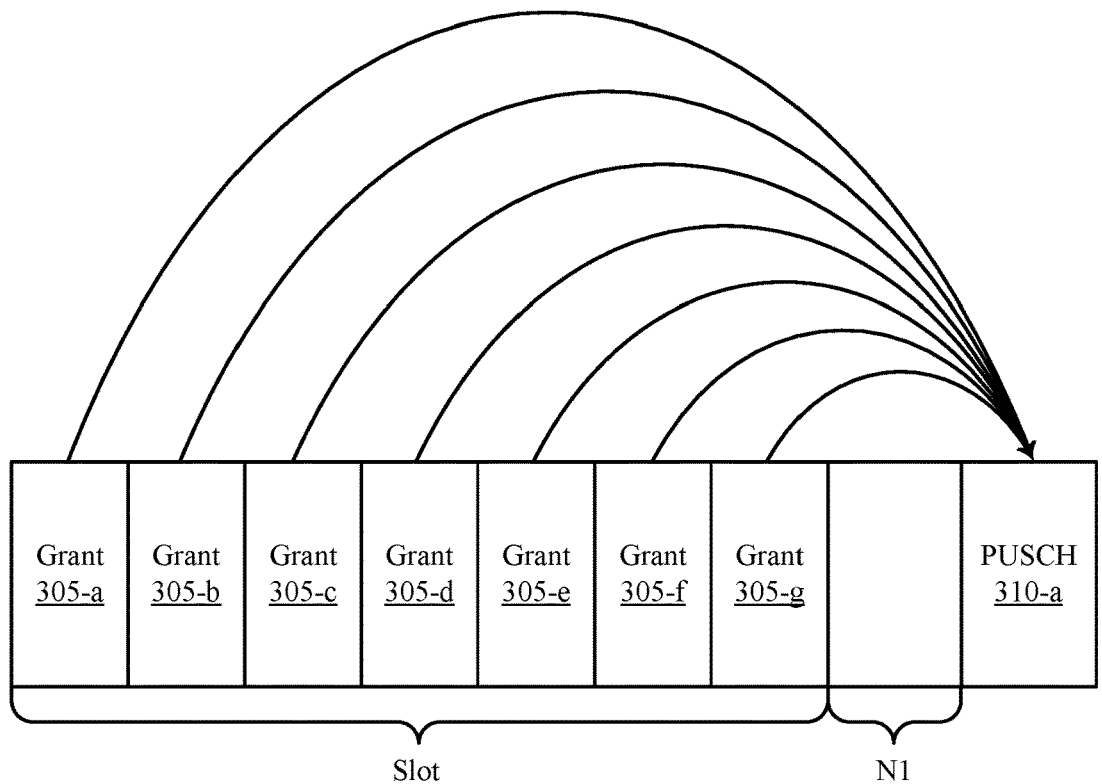
FIGS. 3A and 3B illustrate an examples of uplink data prioritization techniques that support uplink traffic prioritization across multiple links in accordance with aspects of the present disclosure.
Figure 3B:
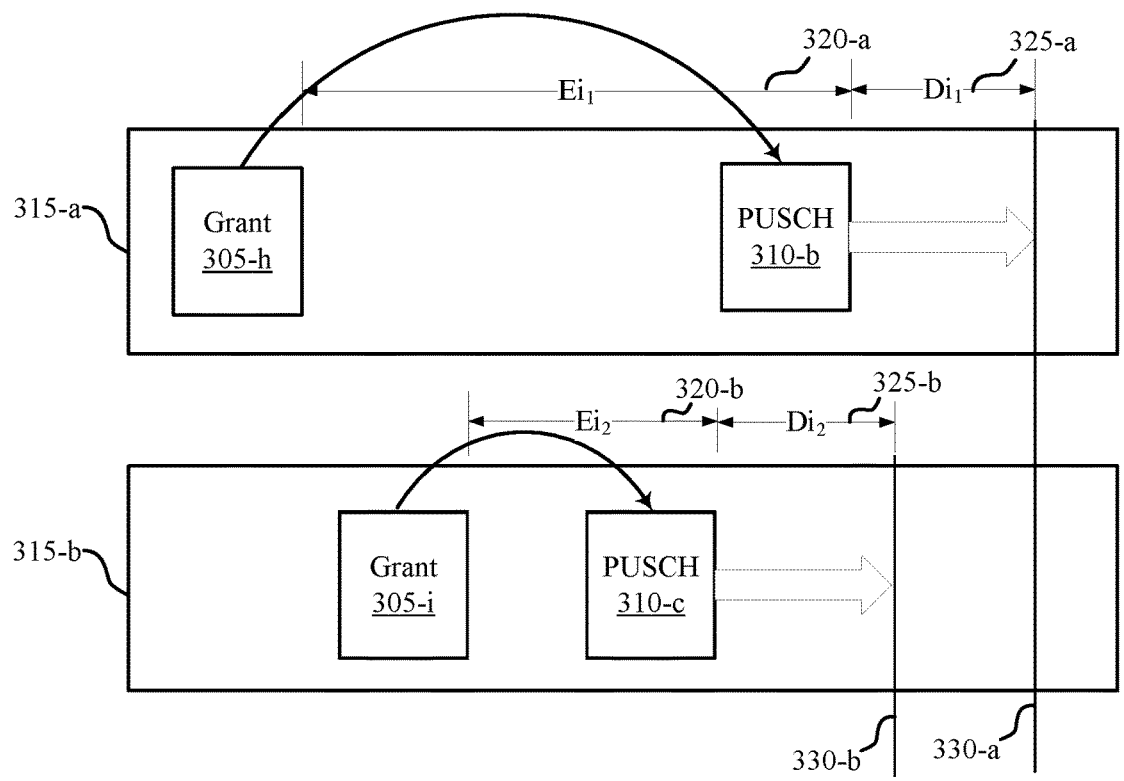

FIGS. 3A and 3B illustrate examples of uplink data prioritization techniques 301 and 302 that support uplink traffic prioritization in accordance with aspects of the present disclosure. In some examples, uplink data prioritization techniques 301 and 302 may implement aspects of wireless communications system 100 or 200. The operations of uplink data prioritization techniques 301 and 302 may be implemented by a UE 115 or its components as described herein.

A UE may receive the grants 305 (e.g., uplink grants, PDCCHs, PDSCHs) of the uplink data prioritization technique 301, and the UE may transmit data to a base station according to PUSCH 310-*a*. In some cases, a PUSCH time allocation may be configured through a radio resource control (RRC) procedure for a link or RAT, and in some additional or alternative cases, the uplink data prioritization technique 301 may correspond to a link or RAT. One or more grants 305 may contain or indicate DCI that indicates granted uplink resources (e.g., PUSCH 310-*a*). The DCI may contain parameters such as K2 and SLIV. K2 may indicate the gap between the DCI and the starting slot, and SLIV may indicate the starting symbol and length of symbols for transmission. In some cases, a UE may determine a completion time for processing data corresponding to an uplink resource based on K2 and/or SLIV.

In some cases, the UE may estimate or approximate the completion time for processing data corresponding to an uplink resource based on the decoding time of PUSCH 310-*a* (e.g., N1) and/or the gap between a grant 305 and a PUSCH 310. In some additional or alternative cases, a group of grants (e.g., grant 305-*a*, grant 305-*b*, grant 305-*c*, grant 305-*d*, grant 305-*e*, grant 305-*f*, and grant 305-*g*) may correspond to a slot. Some grants 305 may correspond to the same earliest uplink resource (e.g., PUSCH 310-*a*), and some grants 305 may correspond to different gaps between the grant 305 and the PUSCH 310. For example, the gap between grant 305-*a* and PUSCH 310-*a* may correspond to a gap of N1+12, while the gap between grant 305-*g* and PUSCH 310-*a* may correspond to a gap of N1.

The UE may be associated with multiple links. For example, the uplink data prioritization technique 302 illustrates a first link 315-*a* and a second link 315-*b*. In some cases, first link 315-*a* and second link 315-*b* may be associated with a first RAT (e.g., 5G NR), while in some additional or alternative cases, second link 315-*b* may be associated with a first RAT (e.g., 5G NR) and first link 315-*a* may be associated with a second RAT (e.g., 4G LTE). A bearer may be configured for the UE to use both the first link 315-*a* and the second link 315-*b*.

The UE may receive multiple grants (e.g., grant 305-*h* and grant 305-*i*) and transmit packets to one or more base stations base on uplink resources (e.g., PUSCH 310-*b* and PUSCH 310-*c*) associated with the grants. The UE may transmit a group of packets based on the time the grants are received and the Ei or Di times associated with the uplink resources. For example, the UE may determine $Ei_1$ 320-*a* and $Di_1$ 325-*a* associated with the grant for PUSCH 310-*b* and $Ei_2$ 320-*b* and $Di_2$ 325-*b* associated with the grant for PUSCH 310-*c*. In some cases, the UE may transmit higher priority packets (e.g., having a lower sequence number, ACK/NACK packets) on the link having an earlier transmission time (e.g., based on the time of the grant and the Ei times 320). For example, the UE may determine that although the grant for PUSCH 310-*b* was received earlier than the grant for PUSCH 310-*c*, the shorter Ei time for PUSCH 310-*c* results in an earlier transmission time (e.g., end of the OTA time).

In some cases, the UE may determine or predict the completion time (e.g., based on the grants and Ei+Di) for decoding packets transmitted on multiple uplink resources, and the UE may transmit the higher priority packets (e.g., having a lower sequence number, ACK/NACK packets) based on the completion time for decoding the packets. For example, the UE may determine that the completion time 330-*b* for decoding packets corresponding to PUSCH 310-*c* of link 315-*b* precedes the completion time 330-*a* for decoding packets corresponding to PUSCH 310-*b* of link 315-*a*, so the UE may transmit the group of packets according to PUSCH 310-*c* of link 315-*b*. The UE may determine Di based on downlink transmission patterns such as an ACK/NACK pattern, an average ACK/NACK response time, a historic pattern of scheduling a link or an FR, a minimum value associated with a past PUSCH ACK/NACK timing, or an estimated value based on a PDSCH decoding time (e.g., N1). In some additional or alternative examples, the UE may transmit a first group of packets associated with a first group of PDCP sequence numbers according to PUSCH 310-c and a second group of packets associated with a second group of PDCP sequence numbers according to PUSCH 310-b. The first group of PDCP sequence number may be lower than the second group of PDCP sequence numbers, so the network may receive packets in sequential order. Determining the completion time for decoding packets associated with multiple links 315 supports a UE in transmitting packets in sequential order, which may reduce system latency.

In some cases, the UE may be associated with multiple links 315, and the links 315 may be associated with different RATs, SCSs, FRs, or any combination thereof. The UE may select uplink resources for transmitting packets based on a slot format. In some examples, the UE may consider the symbol directions of symbols of a slot when determining the completion time for decoding packets corresponding to uplink resources. For example, the UE may receive a first grant for a first link that is associated with an LTE RAT and a second grant for the second link that is associated with an NR RAT. The UE may determine which uplink resources are associated with an earlier completion time for decoding packets based on which uplink resources support an earlier uplink direction, which resources support an earlier flexible direction, which uplink resources support only an uplink direction, or the like. Some RATs may have a fixed association of symbol directions for each slot, while some RATs may have a flexible or dynamic allocation, and may use an indicator (e.g., slot format indicator) to indicate symbol directions on a slot-by-slot basis. The UE may consider the allocated uplink symbols for fixed allocations and dynamically allocated symbols in determining completion times for decoding packets sent via the links. For example, the uplink resources associated with the first grant may overlap with the resources associated with the second grant in the time domain and the uplink resources associated with the first grant may be associated with a slot that includes a higher number of uplink symbol directions, and thus in some cases the UE may determine that the uplink resources associated with the first grant are associated with an earlier completion time for decoding packets.

Figure 4:
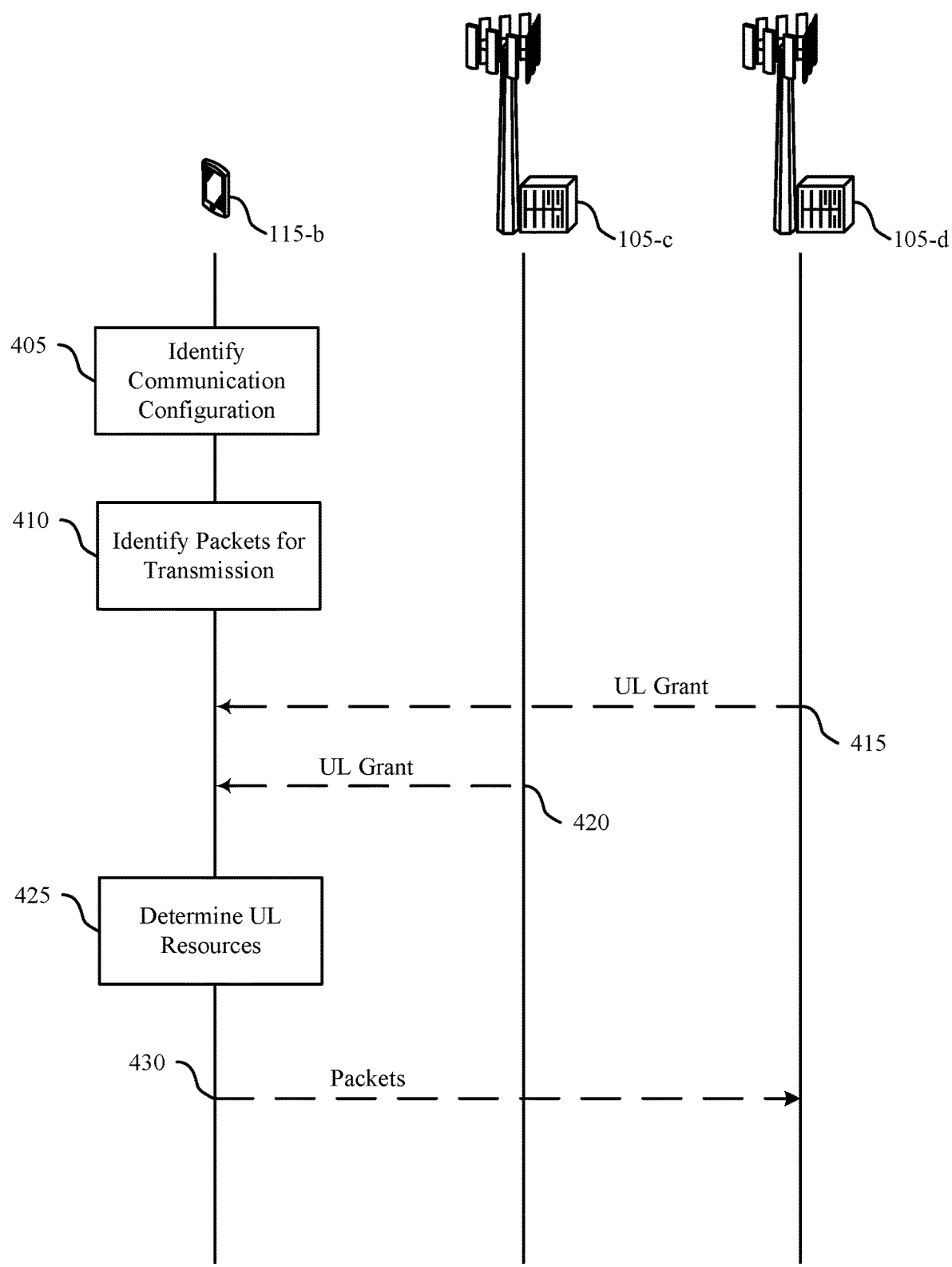
FIG. 4 illustrates an example of a process flow that supports uplink traffic prioritization across multiple links in accordance with aspects of the present disclosure.

FIG. 4 illustrates an example of a process flow 400 that supports uplink traffic prioritization in accordance with aspects of the present disclosure. In some examples, the process flow 400 may implement aspects of wireless communications systems 100 and 200. The process flow 400 includes UE 115-b, base station 105-c, and base station 105-d, which may be examples of the corresponding devices described with reference to FIGS. 1 through 3. UE 115-b may split uplink data across links to improve network efficiency and decrease latency. Alternative examples of the following may be implemented, where some steps are performed in a different order than described or are not performed at all. In some cases, steps may include additional features not mentioned below, or further steps may be added.

At 405, UE 115-b may identify a communication configuration for a bearer that includes a first link and a second link. In some cases, the communication configuration may be based on an RRC procedure, downlink control information, or a combination thereof. The first link may correspond to a first RAT or a first FR, and the second link may correspond to a second RAT or a second FR.

At 410, UE 115-b may identify packets for transmission via the bearer, and each packet may be associated with a sequence number (e.g., a PDCP sequence number). At 415, UE 115-b may receive a first uplink grant from base station 105-d, and the first uplink grant may correspond to first uplink resources (e.g., a first link). At 420, UE 115-b may receive a second uplink grant from base station 105-c, and the second uplink grant may correspond to second uplink resources (e.g., a second link). In some cases, the first grant and the second grant may be received from the same base station 105, and each of the two grants may correspond to a different cell or a different FR. In some other examples, the first base station may be different from the second base station, and each of the two grants may correspond to a link.

At 425, UE 115-b may determine an association of the packets to the first uplink resources or the second uplink resources based on the sequence numbers of the packets and respective transmission times for the first uplink resources and the second uplink resources, or completion times of decoding processes associated with the first uplink resources and the second uplink resources. In some examples, 425 may be performed prior to each symbol where a PUSCH OTA begins. That is, each time a PUSCH OTA begins, the UE 115-b may consider each pending grant and determine an association of pending packets (e.g., packets in an RLC or PDCP buffer) with uplink resources (e.g., of one or more grants). UE 115-b may determine the respective completion times of the decoding processes associated with the first uplink resources and the second uplink resources based on time-frequency parameters, a downlink scheduling pattern, an uplink scheduling patter, a frame structure, or any combination thereof. In some cases, UE 115-a may determine a completion time of decoding packets associated with the first uplink resources, a completion time of decoding packets associated with the second uplink resources, identify which uplink resources are associated with an earlier completion time, and associate the packets with the uplink resources that are associated with the earlier completion time.

At 430, UE 115-b may transmit the packets over the first uplink resources or the second uplink resources in accordance with the determined association of the one or more packets to the first uplink resources or the second uplink resources. In some cases, UE 115-b may transmit a first group of packets based on the uplink resources that are associated with the earlier completion time and a second group of packets based on the uplink resources that are associated with a later completion time. In some cases, the first group of packets may be associated with a priority that is higher than the priority that is associated with the second group of packets. In some additional or alternative cases, the first group of packets may be associated with a group sequence numbers that precede the group of sequence numbers associated with the second group of packets. Ordering the transmission of packets based on uplink resources according to a completion time associated with the uplink resources may improve system efficiency.

Figure 5:
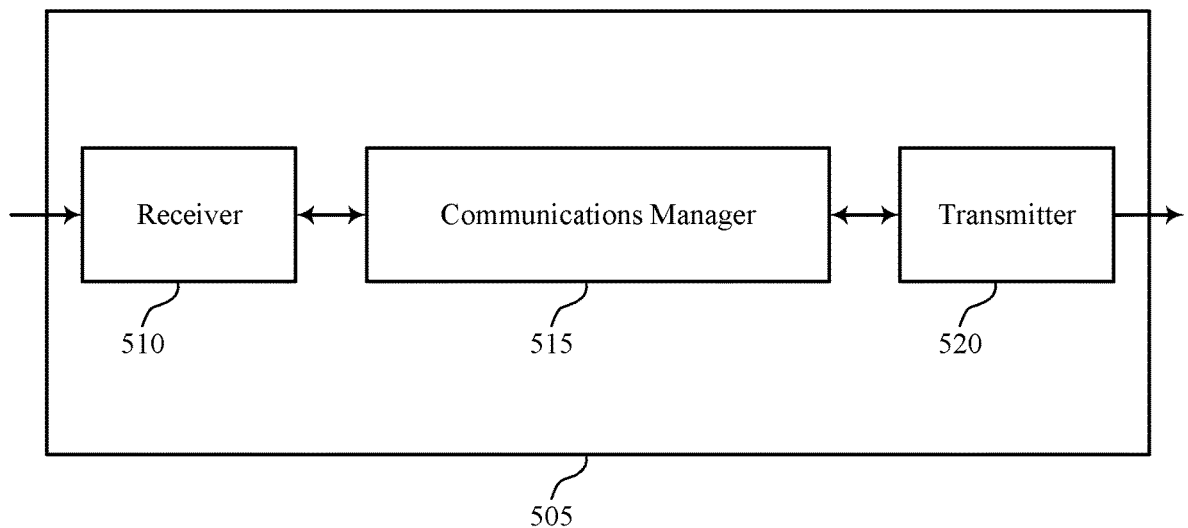
FIGS. 5 and 6 show block diagrams of devices that support uplink traffic prioritization across multiple links in accordance with aspects of the present disclosure.

FIG. 5 shows a block diagram 500 of a device 505 that supports uplink traffic prioritization across multiple links in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink traffic prioritization across multiple links, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a communication configuration for a bearer including a first link and a second link, identify one or more packets for transmission via the bearer, each of the one or more packets associated with a sequence number, determine an association of the one or more packets to the first uplink resources or the second uplink resources based on the sequence numbers of the one or more packets and respective completion times of decoding processes associated with the first uplink resources and the second uplink resources, transmit the one or more packets over the first uplink resources or the second uplink resources in accordance with the determined association of the one or more packets to the first uplink resources or the second uplink resources, and receive a first grant of first uplink resources of the first link and a second grant of second uplink resources of the second link. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
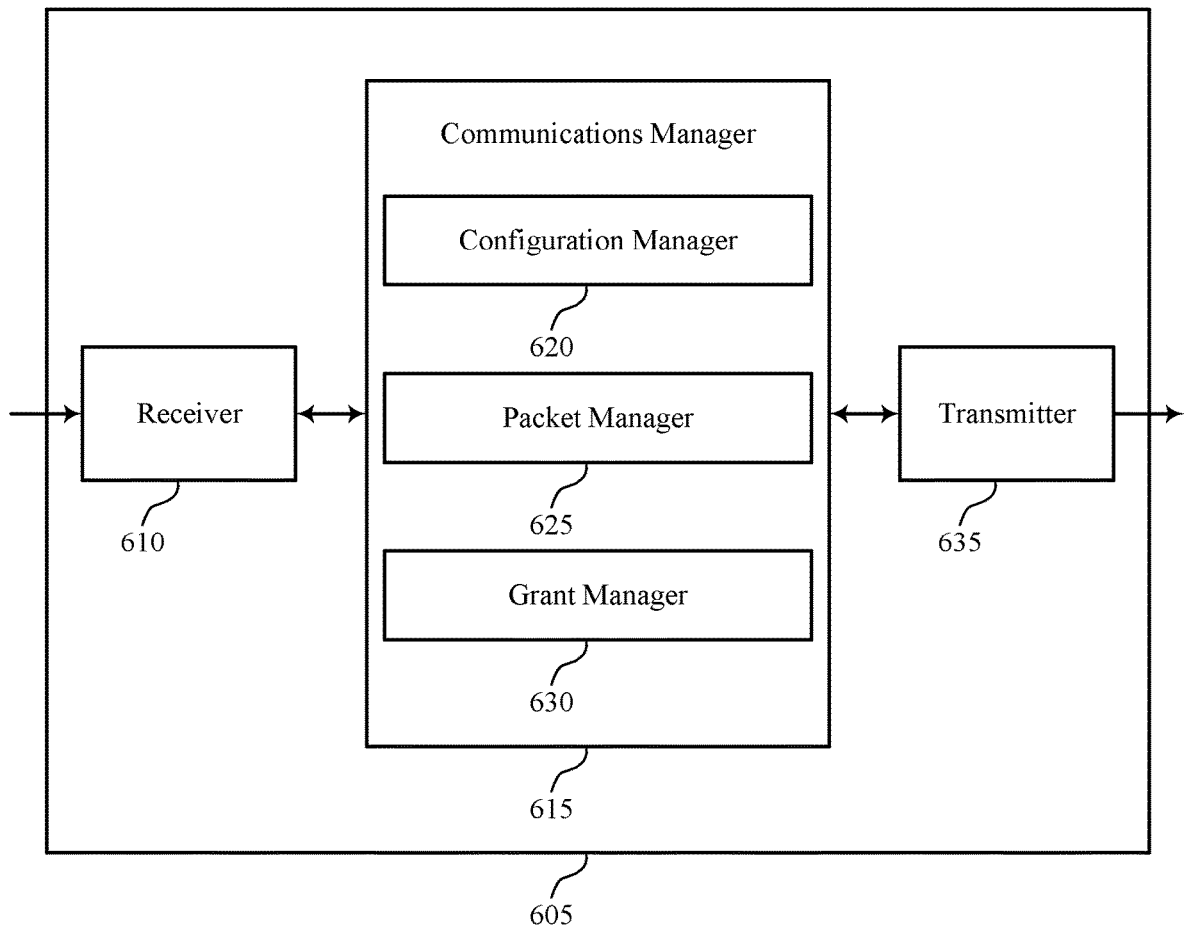

FIG. 6 shows a block diagram 600 of a device 605 that supports uplink traffic prioritization across multiple links in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink traffic prioritization across multiple links, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a configuration manager 620, a packet manager 625, and a grant manager 630. The communications manager 615 may be an example of aspects of the communications manager 810 described herein.

The configuration manager 620 may identify a communication configuration for a bearer including a first link and a second link.

The packet manager 625 may identify one or more packets for transmission via the bearer, each of the one or more packets associated with a sequence number, determine an association of the one or more packets to the first uplink resources or the second uplink resources based on the sequence numbers of the one or more packets and respective completion times of decoding processes associated with the first uplink resources and the second uplink resources, and transmit the one or more packets over the first uplink resources or the second uplink resources in accordance with the determined association of the one or more packets to the first uplink resources or the second uplink resources.

The grant manager 630 may receive a first grant of first uplink resources of the first link and a second grant of second uplink resources of the second link.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
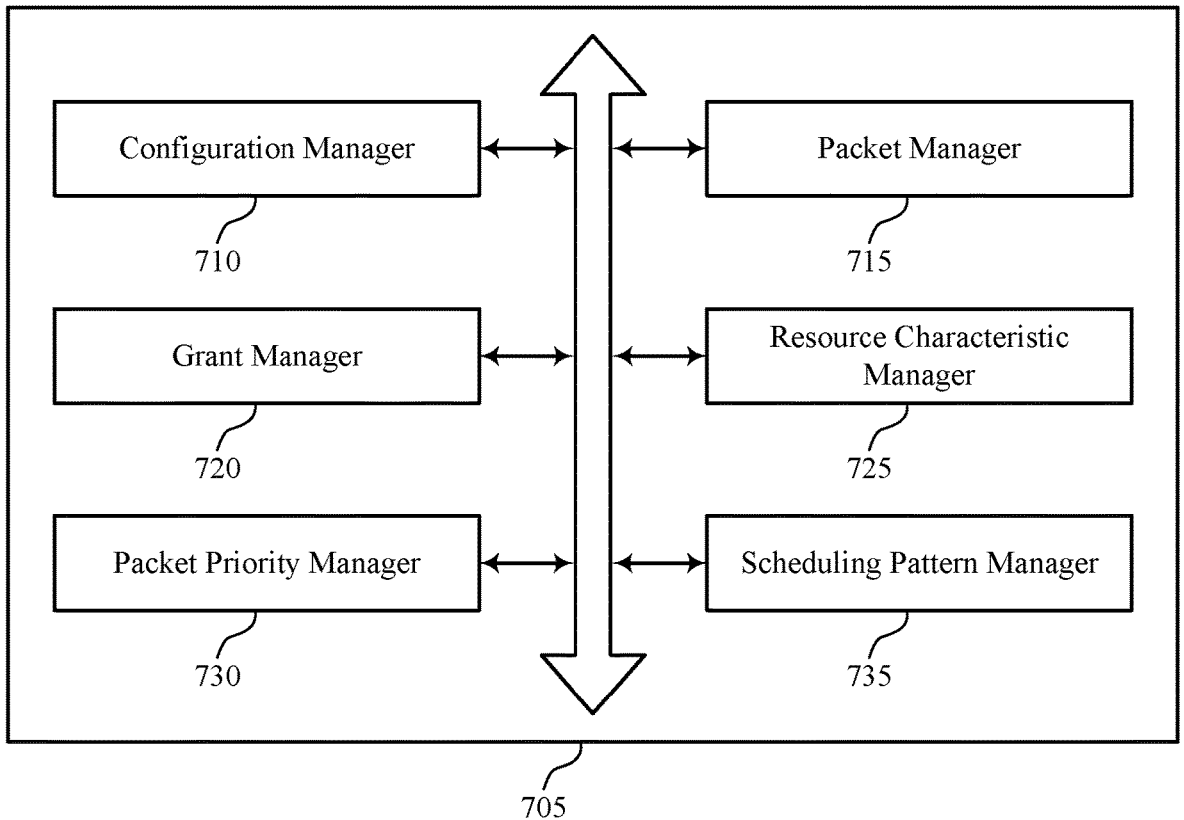
FIG. 7 shows a block diagram of a communications manager that supports uplink traffic prioritization across multiple links in accordance with aspects of the present disclosure.

FIG. 7 shows a block diagram 700 of a communications manager 705 that supports uplink traffic prioritization across multiple links in accordance with aspects of the present disclosure. The communications manager 705 may be an example of aspects of a communications manager 515, a communications manager 615, or a communications manager 810 described herein. The communications manager 705 may include a configuration manager 710, a packet manager 715, a grant manager 720, a resource characteristic manager 725, a packet priority manager 730, and a scheduling pattern manager 735. Each of these modules may communicate, directly or indirectly, with one another (e.g., via one or more buses).

The configuration manager 710 may identify a communication configuration for a bearer including a first link and a second link.

The packet manager 715 may identify one or more packets for transmission via the bearer, each of the one or more packets associated with a sequence number.

In some examples, the packet manager 715 may determine an association of the one or more packets to the first uplink resources or the second uplink resources based on the sequence numbers of the one or more packets and respective completion times of decoding processes associated with the first uplink resources and the second uplink resources.

In some examples, the packet manager 715 may transmit the one or more packets over the first uplink resources or the second uplink resources in accordance with the determined association of the one or more packets to the first uplink resources or the second uplink resources.

In some cases, the sequence number corresponds to a packet data convergence protocol (PDCP) sequence number.

The grant manager 720 may receive a first grant of first uplink resources of the first link and a second grant of second uplink resources of the second link.

The resource characteristic manager 725 may identify a first set of characteristics of the first uplink resources and a second set of characteristics of the second uplink resources.

In some examples, the resource characteristic manager 725 may determine the respective completion times of the decoding processes associated with the first uplink resources and the second uplink resources based on the first set of characteristics and the second set of characteristics.

In some examples, the resource characteristic manager 725 may determine respective timing of the first uplink resources and the second uplink resources based on the first set of characteristics and the second set of characteristics.

In some examples, the resource characteristic manager 725 may determine the association of the one or more packets to the first uplink resources or the second uplink resources based on the respective timing of the first uplink resources and the second uplink resources.

In some examples, the resource characteristic manager 725 may determine respective characteristics associated with decoding of the first uplink resources and the second uplink resources by one or more base stations.

In some examples, the resource characteristic manager 725 may determine the respective completion times of the decoding processes associated with the first uplink resources and the second uplink resources based on the respective characteristics.

In some examples, the resource characteristic manager 725 may determine respective acknowledgment transmission patterns of the one or more base stations.

In some cases, the respective timing includes respective start times or respective end times of the first uplink resources and the second uplink resources.

In some cases, the first and second sets of characteristics include respective sub-carrier spacings, respective transmission time intervals, respective uplink transmission start times, respective uplink transmission lengths, or combinations thereof.

In some cases, the one or more packets include a first packet of a first priority and a second packet of a second priority that is higher than the first priority. In some cases, the packet priority manager 730 may assign the second packet to resources having a first completion time of the respective completion times of the decoding processes associated with the first uplink resources and the second uplink resources.

The scheduling pattern manager 735 may determine respective downlink scheduling patterns of the first link and the second link.

In some examples, the scheduling pattern manager 735 may determine the association of the one or more packets to the first uplink resources or the second uplink resources based on the respective downlink scheduling patterns.

In some examples, the scheduling pattern manager 735 may identify a primary link of the first link and the second link based on the downlink scheduling pattern, where determining the association of the one or more packets to the first uplink resources or the second uplink resources is based on the primary link.

Figure 8:
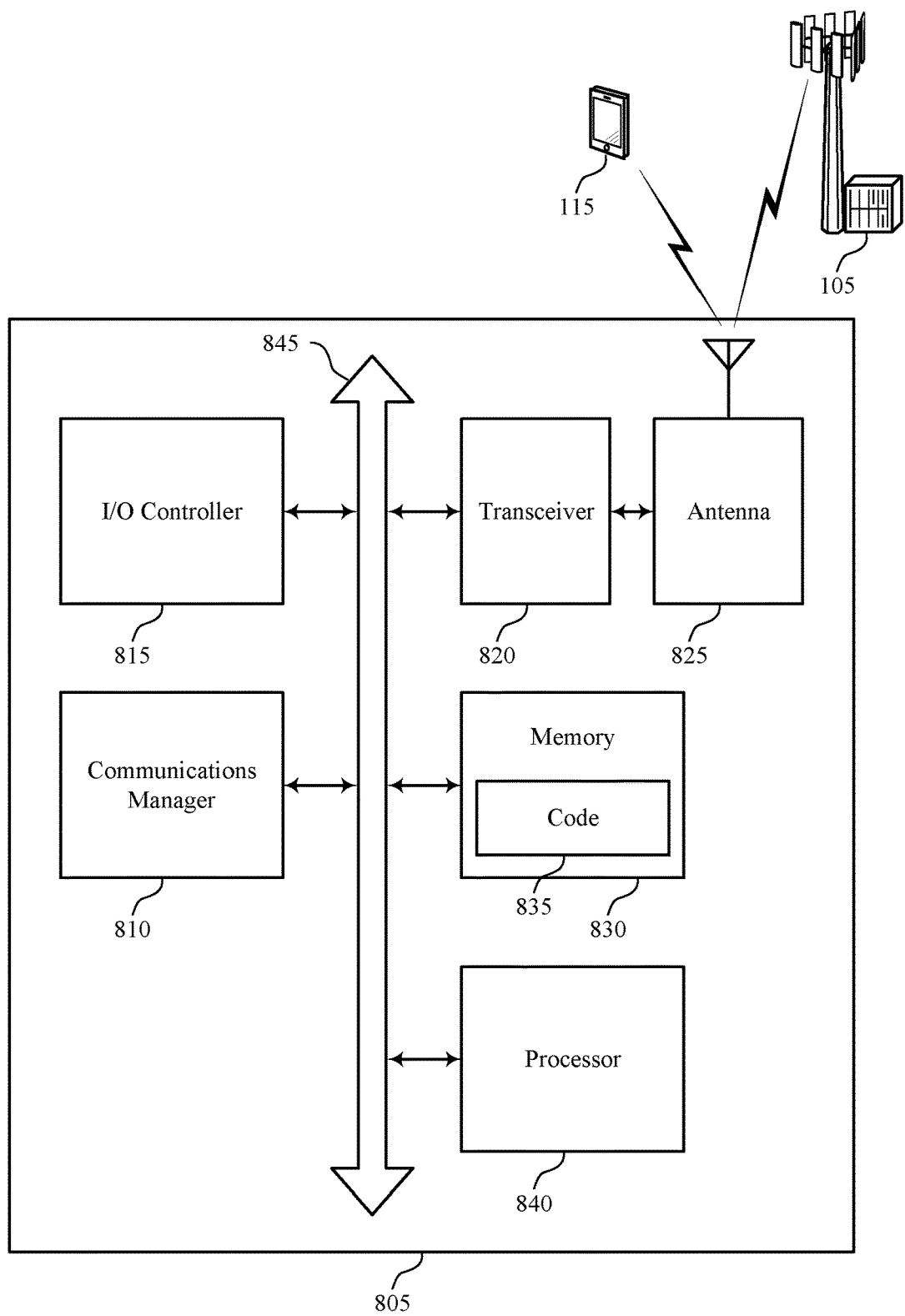
FIG. 8 shows a diagram of a system including a device that supports uplink traffic prioritization across multiple links in accordance with aspects of the present disclosure.

FIG. 8 shows a diagram of a system 800 including a device 805 that supports uplink traffic prioritization across multiple links in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a communication configuration for a bearer including a first link and a second link, identify one or more packets for transmission via the bearer, each of the one or more packets associated with a sequence number, determine an association of the one or more packets to the first uplink resources or the second uplink resources based on the sequence numbers of the one or more packets and respective completion times of decoding processes associated with the first uplink resources and the second uplink resources, transmit the one or more packets over the first uplink resources or the second uplink resources in accordance with the determined association of the one or more packets to the first uplink resources or the second uplink resources, and receive a first grant of first uplink resources of the first link and a second grant of second uplink resources of the second link.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a Basic Input/Output System (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink traffic prioritization across multiple links).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
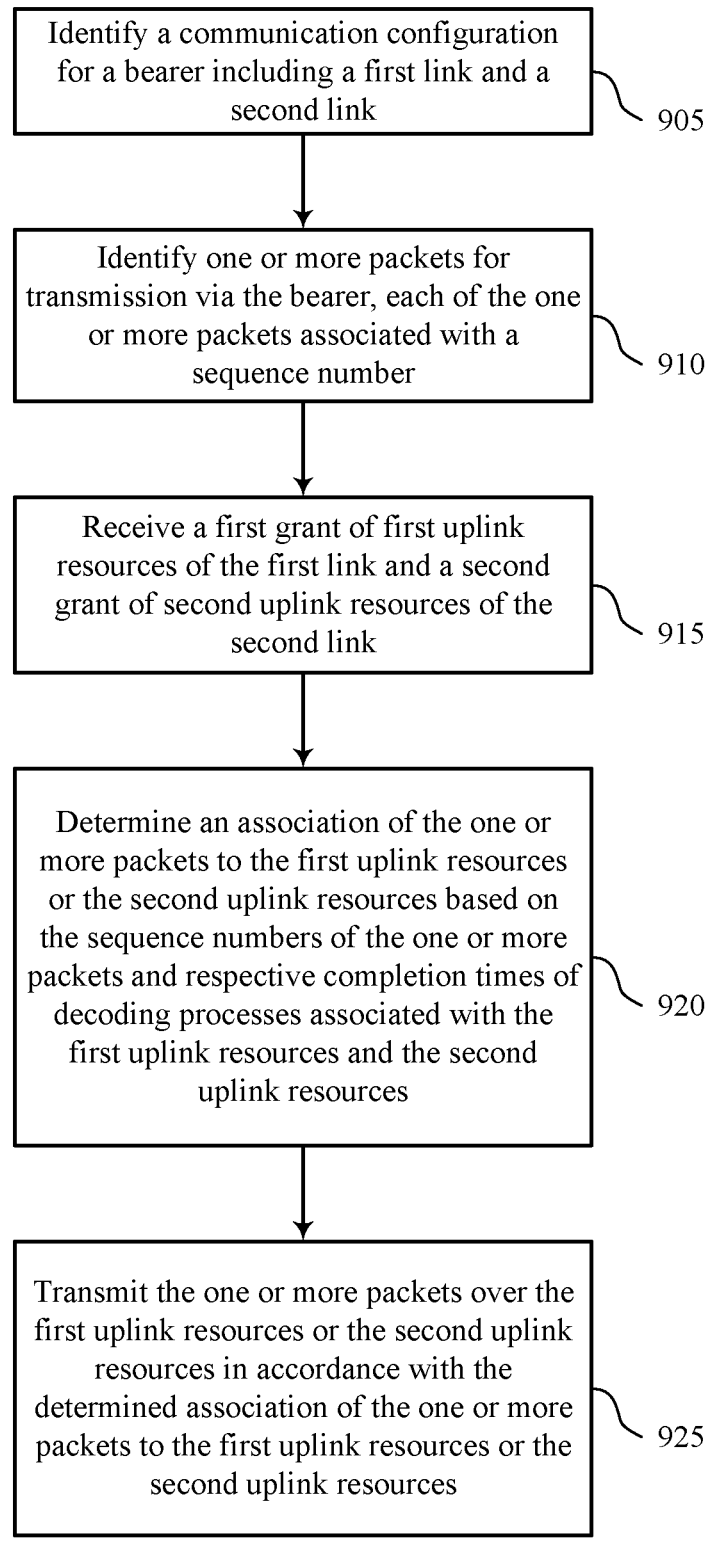
FIGS. 9 and 10 show flowcharts illustrating methods that support uplink traffic prioritization across multiple links in accordance with aspects of the present disclosure.

FIG. 9 shows a flowchart illustrating a method 900 that supports uplink traffic prioritization across multiple links in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may identify a communication configuration for a bearer including a first link and a second link. The operations of 905 may be performed according to the methods described herein. In some examples, aspects of the operations of 905 may be performed by a configuration manager as described with reference to FIGS. 5 through 8.

At 910, the UE may identify one or more packets for transmission via the bearer, each of the one or more packets associated with a sequence number. The operations of 910 may be performed according to the methods described herein. In some examples, aspects of the operations of 910 may be performed by a packet manager as described with reference to FIGS. 5 through 8.

At 915, the UE may receive a first grant of first uplink resources of the first link and a second grant of second uplink resources of the second link. The operations of 915 may be performed according to the methods described herein. In some examples, aspects of the operations of 915 may be performed by a grant manager as described with reference to FIGS. 5 through 8.

At 920, the UE may determine an association of the one or more packets to the first uplink resources or the second uplink resources based on the sequence numbers of the one or more packets and respective completion times of decoding processes associated with the first uplink resources and the second uplink resources. The operations of 920 may be performed according to the methods described herein. In some examples, aspects of the operations of 920 may be performed by a packet manager as described with reference to FIGS. 5 through 8.

At 925, the UE may transmit the one or more packets over the first uplink resources or the second uplink resources in accordance with the determined association of the one or more packets to the first uplink resources or the second uplink resources. The operations of 925 may be performed according to the methods described herein. In some examples, aspects of the operations of 925 may be performed by a packet manager as described with reference to FIGS. 5 through 8.

Figure 10:
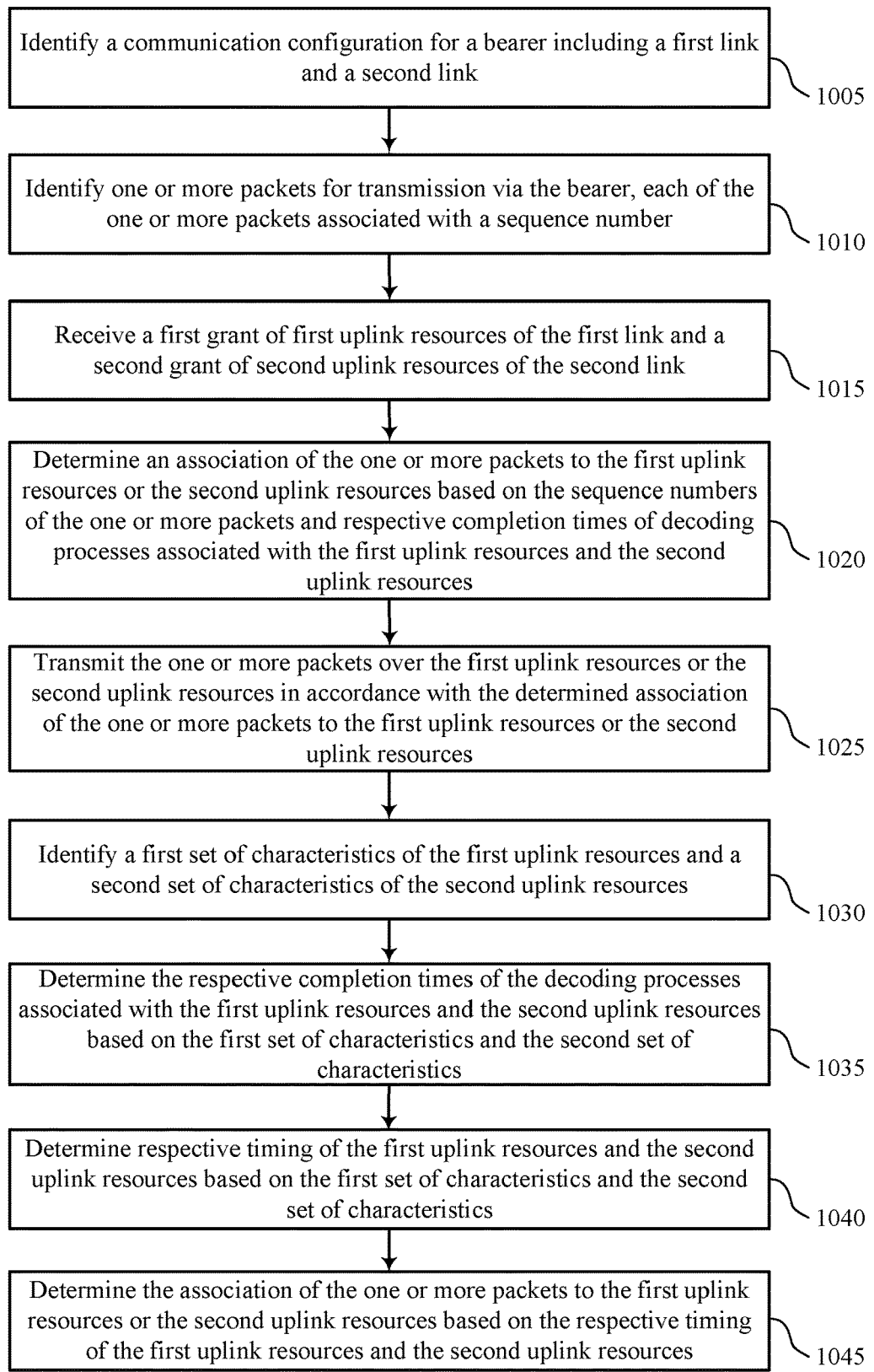

FIG. 10 shows a flowchart illustrating a method 1000 that supports uplink traffic prioritization across multiple links in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may identify a communication configuration for a bearer including a first link and a second link. The operations of 1005 may be performed according to the methods described herein. In some examples, aspects of the operations of 1005 may be performed by a configuration manager as described with reference to FIGS. 5 through 8.

At 1010, the UE may identify one or more packets for transmission via the bearer, each of the one or more packets associated with a sequence number. The operations of 1010 may be performed according to the methods described herein. In some examples, aspects of the operations of 1010 may be performed by a packet manager as described with reference to FIGS. 5 through 8.

At 1015, the UE may receive a first grant of first uplink resources of the first link and a second grant of second uplink resources of the second link. The operations of 1015 may be performed according to the methods described herein. In some examples, aspects of the operations of 1015 may be performed by a grant manager as described with reference to FIGS. 5 through 8.

At 1020, the UE may determine an association of the one or more packets to the first uplink resources or the second uplink resources based on the sequence numbers of the one or more packets and respective completion times of decoding processes associated with the first uplink resources and the second uplink resources. The operations of 1020 may be performed according to the methods described herein. In some examples, aspects of the operations of 1020 may be performed by a packet manager as described with reference to FIGS. 5 through 8.

At 1025, the UE may transmit the one or more packets over the first uplink resources or the second uplink resources in accordance with the determined association of the one or more packets to the first uplink resources or the second uplink resources. The operations of 1025 may be performed according to the methods described herein. In some examples, aspects of the operations of 1025 may be performed by a packet manager as described with reference to FIGS. 5 through 8.

At 1030, the UE may identify a first set of characteristics of the first uplink resources and a second set of characteristics of the second uplink resources. The operations of 1030 may be performed according to the methods described herein. In some examples, aspects of the operations of 1030 may be performed by a resource characteristic manager as described with reference to FIGS. 5 through 8.

At 1035, the UE may determine the respective completion times of the decoding processes associated with the first uplink resources and the second uplink resources based on the first set of characteristics and the second set of characteristics. The operations of 1035 may be performed according to the methods described herein. In some examples, aspects of the operations of 1035 may be performed by a resource characteristic manager as described with reference to FIGS. 5 through 8.

At 1040, the UE may determine respective timing of the first uplink resources and the second uplink resources based on the first set of characteristics and the second set of characteristics. The operations of 1040 may be performed according to the methods described herein. In some examples, aspects of the operations of 1040 may be performed by a resource characteristic manager as described with reference to FIGS. 5 through 8.

At 1045, the UE may determine the association of the one or more packets to the first uplink resources or the second uplink resources based on the respective timing of the first uplink resources and the second uplink resources. The operations of 1045 may be performed according to the methods described herein. In some examples, aspects of the operations of 1045 may be performed by a resource characteristic manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a communication configuration for a bearer comprising a first link and a second link;
   identifying one or more packets for transmission via the bearer, each of the one or more packets associated with a sequence number;
   receiving a first grant of first uplink resources of the first link and a second grant of second uplink resources of the second link;
   determining an association of the one or more packets to the first uplink resources or the second uplink resources based at least in part on the sequence numbers of the one or more packets and respective completion times of decoding processes associated with the first uplink resources and the second uplink resources; and
   transmitting the one or more packets over the first uplink resources or the second uplink resources in accordance with the determined association of the one or more packets to the first uplink resources or the second uplink resources.

2. The method of claim 1, further comprising:
   identifying a first set of characteristics of the first uplink resources and a second set of characteristics of the second uplink resources; and
   determining the respective completion times of the decoding processes associated with the first uplink resources and the second uplink resources based at least in part on the first set of characteristics and the second set of characteristics.

3. The method of claim 2, further comprising:
   determining respective timing of the first uplink resources and the second uplink resources based at least in part on the first set of characteristics and the second set of characteristics; and
   determining the association of the one or more packets to the first uplink resources or the second uplink resources based at least in part on the respective timing of the first uplink resources and the second uplink resources.

4. The method of claim 3, wherein the respective timing comprises respective start times or respective end times of the first uplink resources and the second uplink resources.

5. The method of claim 2, wherein the first and second sets of characteristics comprise respective sub-carrier spacings, respective transmission time intervals, respective uplink transmission start times, respective uplink transmission lengths, or combinations thereof.

6. The method of claim 1, wherein the one or more packets comprise a first packet of a first priority and a second packet of a second priority that is higher than the first priority, the method further comprising:
   assigning the second packet to resources having a first completion time of the respective completion times of the decoding processes associated with the first uplink resources and the second uplink resources.

7. The method of claim 1, further comprising:
   determining respective characteristics associated with decoding of the first uplink resources and the second uplink resources by one or more base stations; and
   determining the respective completion times of the decoding processes associated with the first uplink resources and the second uplink resources based at least in part on the respective characteristics.

8. The method of claim 7, wherein determining the respective characteristics associated with decoding of the first uplink resources and the second uplink resources by the one or more base stations comprises:
   determining respective acknowledgment transmission patterns of the one or more base stations.

9. The method of claim 1, further comprising:
   determining respective downlink scheduling patterns of the first link and the second link; and
   determining the association of the one or more packets to the first uplink resources or the second uplink resources based at least in part on the respective downlink scheduling patterns.

10. The method of claim 9, further comprising:
    identifying a primary link of the first link and the second link based at least in part on the downlink scheduling pattern, wherein determining the association of the one or more packets to the first uplink resources or the second uplink resources is based at least in part on the primary link.

11. The method of claim 1, wherein the sequence number corresponds to a packet data convergence protocol (PDCP) sequence number.

12. An apparatus for wireless communication at a user equipment (UE), comprising:
    a processor,
    memory coupled with the processor; and
    instructions stored in the memory and executable by the processor to cause the apparatus to:
    identify a communication configuration for a bearer comprising a first link and a second link;
    identify one or more packets for transmission via the bearer, each of the one or more packets associated with a sequence number;
    receive a first grant of first uplink resources of the first link and a second grant of second uplink resources of the second link;
    determine an association of the one or more packets to the first uplink resources or the second uplink resources based at least in part on the sequence numbers of the one or more packets and respective completion times of decoding processes associated with the first uplink resources and the second uplink resources; and
    transmit the one or more packets over the first uplink resources or the second uplink resources in accordance with the determined association of the one or more packets to the first uplink resources or the second uplink resources.

13. The apparatus of claim 12, wherein the instructions are further executable by the processor to cause the apparatus to:
    identify a first set of characteristics of the first uplink resources and a second set of characteristics of the second uplink resources; and determine the respective completion times of the decoding processes associated with the first uplink resources and the second uplink resources based at least in part on the first set of characteristics and the second set of characteristics.

14. The apparatus of claim 13, wherein the instructions are further executable by the processor to cause the apparatus to:
determine respective timing of the first uplink resources and the second uplink resources based at least in part on the first set of characteristics and the second set of characteristics; and
determine the association of the one or more packets to the first uplink resources or the second uplink resources based at least in part on the respective timing of the first uplink resources and the second uplink resources.

15. The apparatus of claim 14, wherein the respective timing comprises respective start times or respective end times of the first uplink resources and the second uplink resources.

16. The apparatus of claim 13, wherein the first and second sets of characteristics comprise respective sub-carrier spacings, respective transmission time intervals, respective uplink transmission start times, respective uplink transmission lengths, or combinations thereof.

17. The apparatus of claim 12, wherein the one or more packets comprise a first packet of a first priority and a second packet of a second priority that is higher than the first priority, and the instructions are further executable by the processor to cause the apparatus to:
assign the second packet to resources having a first completion time of the respective completion times of the decoding processes associated with the first uplink resources and the second uplink resources.

18. The apparatus of claim 12, wherein the instructions are further executable by the processor to cause the apparatus to:
determine respective characteristics associated with decoding of the first uplink resources and the second uplink resources by one or more base stations; and
determine the respective completion times of the decoding processes associated with the first uplink resources and the second uplink resources based at least in part on the respective characteristics.

19. The apparatus of claim 18, wherein the instructions to determine the respective characteristics associated with decoding of the first uplink resources and the second uplink resources by the one or more base stations are executable by the processor to cause the apparatus to:
determine respective acknowledgment transmission patterns of the one or more base stations.

20. The apparatus of claim 12, wherein the instructions are further executable by the processor to cause the apparatus to:
determine respective downlink scheduling patterns of the first link and the second link; and
determine the association of the one or more packets to the first uplink resources or the second uplink resources based at least in part on the respective downlink scheduling patterns.

21. The apparatus of claim 20, wherein the instructions are further executable by the processor to cause the apparatus to:
identify a primary link of the first link and the second link based at least in part on the downlink scheduling pattern, wherein determining the association of the one or more packets to the first uplink resources or the second uplink resources is based at least in part on the primary link.

22. The apparatus of claim 12, wherein the sequence number corresponds to a packet data convergence protocol (PDCP) sequence number.

23. An apparatus for wireless communication at a user equipment (UE), comprising:
means for identifying a communication configuration for a bearer comprising a first link and a second link;
means for identifying one or more packets for transmission via the bearer, each of the one or more packets associated with a sequence number;
means for receiving a first grant of first uplink resources of the first link and a second grant of second uplink resources of the second link;
means for determining an association of the one or more packets to the first uplink resources or the second uplink resources based at least in part on the sequence numbers of the one or more packets and respective completion times of decoding processes associated with the first uplink resources and the second uplink resources; and
means for transmitting the one or more packets over the first uplink resources or the second uplink resources in accordance with the determined association of the one or more packets to the first uplink resources or the second uplink resources.

24. The apparatus of claim 23, further comprising:
means for identifying a first set of characteristics of the first uplink resources and a second set of characteristics of the second uplink resources; and
means for determining the respective completion times of the decoding processes associated with the first uplink resources and the second uplink resources based at least in part on the first set of characteristics and the second set of characteristics.

25. The apparatus of claim 24, further comprising:
means for determining respective timing of the first uplink resources and the second uplink resources based at least in part on the first set of characteristics and the second set of characteristics; and
means for determining the association of the one or more packets to the first uplink resources or the second uplink resources based at least in part on the respective timing of the first uplink resources and the second uplink resources.

26. The apparatus of claim 25, wherein the respective timing comprises respective start times or respective end times of the first uplink resources and the second uplink resources.

27. The apparatus of claim 24, wherein the first and second sets of characteristics comprise respective sub-carrier spacings, respective transmission time intervals, respective uplink transmission start times, respective uplink transmission lengths, or combinations thereof.

28. The apparatus of claim 23, wherein the one or more packets comprise a first packet of a first priority and a second packet of a second priority that is higher than the first priority, the apparatus further comprising:
means for assigning the second packet to resources having a first completion time of the respective completion times of the decoding processes associated with the first uplink resources and the second uplink resources.

29. The apparatus of claim 23, further comprising:
means for determining respective characteristics associated with decoding of the first uplink resources and the second uplink resources by one or more base stations; and
means for determining the respective completion times of the decoding processes associated with the first uplink resources and the second uplink resources based at least in part on the respective characteristics.

30. A non-transitory computer-readable medium storing code for wireless communication at a user equipment (UE), the code comprising instructions executable by a processor to:
identify a communication configuration for a bearer comprising a first link and a second link;
identify one or more packets for transmission via the bearer, each of the one or more packets associated with a sequence number;
receive a first grant of first uplink resources of the first link and a second grant of second uplink resources of the second link;
determine an association of the one or more packets to the first uplink resources or the second uplink resources based at least in part on the sequence numbers of the one or more packets and respective completion times of decoding processes associated with the first uplink resources and the second uplink resources; and
transmit the one or more packets over the first uplink resources or the second uplink resources in accordance with the determined association of the one or more packets to the first uplink resources or the second uplink resources.

* * * * *